(12) United States Patent
Ueyama et al.

(10) Patent No.: US 10,686,956 B2
(45) Date of Patent: Jun. 16, 2020

(54) READING APPARATUS

(71) Applicant: SEIKO EPSON CORPORATION, Tokyo (JP)

(72) Inventors: Naohiro Ueyama, Matsumoto (JP); Motofumi Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/367,066

(22) Filed: Mar. 27, 2019

(65) Prior Publication Data

US 2019/0306351 A1    Oct. 3, 2019

(30) Foreign Application Priority Data

Mar. 28, 2018 (JP) .................................. 2018-061412
Nov. 27, 2018 (JP) .................................. 2018-220933

(51) Int. Cl.
*H04N 1/00* (2006.01)
*E05C 1/08* (2006.01)
*E05B 65/06* (2006.01)

(52) U.S. Cl.
CPC ......... *H04N 1/00554* (2013.01); *E05B 65/06* (2013.01); *H04N 1/00795* (2013.01); *E05C 1/08* (2013.01)

(58) Field of Classification Search
CPC ....... E05B 65/06; E05C 1/08; H04N 1/00554; H04N 1/00795
USPC .......................................................... 358/474
See application file for complete search history.

(56) References Cited

U.S. PATENT DOCUMENTS

| | | | |
|---|---|---|---|
| 6,590,024 B1* | 7/2003 | Gleichenhagen | C08F 2/30 524/502 |
| 7,422,206 B2* | 9/2008 | Okuda | B65H 3/0661 271/121 |
| 7,547,014 B2* | 6/2009 | Okuda | B41J 13/103 271/145 |
| 9,096,401 B2* | 8/2015 | Ueyama | B41J 11/001 |
| 9,097,381 B2* | 8/2015 | Ueyama | F16M 13/02 |
| 9,751,298 B2* | 9/2017 | Ueyama | B26D 1/18 |
| 9,878,562 B2* | 1/2018 | Ueyama | B41J 11/02 |
| 10,500,877 B2* | 12/2019 | Ueyama | B41J 15/02 |
| 2007/0229621 A1* | 10/2007 | Kawamura | B41J 2/1752 347/86 |
| 2011/0148034 A1 | 6/2011 | Inoue | |

(Continued)

FOREIGN PATENT DOCUMENTS

JP    2011-130161 A    6/2011

*Primary Examiner* — Negussie Worku
(74) *Attorney, Agent, or Firm* — Workman Nydegger

(57) ABSTRACT

A reading apparatus includes a cover configured to pivot to an open position and a closed position, a lock mechanism configured to restrict the cover in the closed position from pivoting to the open position, and a reading unit provided in the cover or in a member facing the cover in the closed position, and configured to read a medium when the cover is in the closed position. The cover includes a protruding portion. A latch face configured to come into contact with a face of the protruding portion facing toward one direction along a first axis when the cover is in a closed position, the first axis being orthogonal to a pivoting shaft of the cover. The latch face is configured to move in the other direction along the first axis when the latch moves from a lock release position to a lock position.

8 Claims, 13 Drawing Sheets

(56) References Cited

U.S. PATENT DOCUMENTS

| | | | |
|---|---|---|---|
| 2013/0306784 A1* | 11/2013 | Ueyama | B41J 11/001 242/560 |
| 2017/0008316 A1* | 1/2017 | Ueyama | B26D 1/18 |
| 2017/0254119 A1* | 9/2017 | Raz | E05B 17/2007 |
| 2018/0250963 A1* | 9/2018 | Ueyama | B41J 15/042 |

* cited by examiner

READING APPARATUS

BACKGROUND

The present disclosure relates to a reading apparatus.

Reading apparatuses of various configurations have been used in the related art. Among these, a reading apparatus including a cover configured to pivot between an open position and a closed position has been used.

For example, in JP-A-2011-130161, there is disclosed an image scanner (reading apparatus) including a cover configured to pivot between an open position and a closed position.

SUMMARY

In a reading apparatus in the related art including a cover configured to pivot between an open position and a closed position, such as the image scanner disclosed in JP-A-2011-130161, it is required that the cover locks in the closed position in a stable manner with favorable operability. In general, in such a reading apparatus in the related art, when the cover is locked in the closed position, an engaging portion of the cover is caused to engage (is hooked onto) with a target engaging portion, and to make such engagement, the cover is temporarily pressed further inward than a position where the cover is fixed to lock the cover. However, in such a reading apparatus, a space inside the apparatus is often narrow to suppress an increase in a size of the apparatus. When the space inside the apparatus is narrow, a pressing region necessary for locking the cover in the closed position is often insufficiently secured, making it difficult to lock the cover in the closed position in a stable manner with favorable operability.

One advantage of certain embodiments is to provide a reading apparatus including a cover configured to pivot to an open position and a closed position, and in the reading apparatus, even when a space inside the apparatus is narrow, the cover is locked in the closed position in a stable manner with favorable operability.

According to one embodiment, a reading apparatus includes a cover configured to pivot to an open position and a closed position, a lock mechanism of the cover configured to restrict the cover pivoting in a first pivoting direction in a state where the cover is in the closed position, the first pivoting direction being the direction toward the open position, and a reading unit provided in the cover or in a position facing the cover in a state where the cover is in the closed position, and configured to read a medium in a state where the cover is in the closed position. The cover includes an engaging portion protruding in a second pivoting direction opposite to the first pivoting direction. The lock mechanism includes a latch configured to move, in an intersecting direction intersecting a pivoting shaft direction of the cover, to a lock position in which the latch is configured to engage with an engaging recessed portion of the engaging portion, and a lock release position in which the latch does not engage with the engaging recessed portion. The latch includes a latch face configured to, in a state where the cover is in the closed position, come into contact with an engaging face of the engaging recessed portion facing a leading side in the first pivoting direction and, in association with the cover pivoting in the second pivoting direction, move in the intersecting direction and move to the leading side in the first pivoting direction.

In a reading apparatus according to another embodiment, the engaging recessed portion is formed rearward, in the second pivoting direction, of a leading side end portion in the second pivoting direction of the engaging portion, and the latch is provided in a position between a pivoting shaft of the cover and the leading side end portion in a direction intersecting the pivoting shaft direction of the cover and the intersecting direction, in a state where the cover is in the closed position.

In a reading apparatus according to another embodiment, an inclined face configured to cause a force acting on the latch to escape toward the lock release position side is formed on a leading side in the second pivoting direction of the engaging portion, the force being caused by the engaging portion and the latch contacting when the cover pivots in the second pivoting direction from the open position.

In a reading apparatus according to another embodiment, an inclined face configured to cause a force acting on the latch to escape toward the lock release position side is formed on a side facing the latch face of the latch, the force being caused by the engaging portion and the latch contacting when the cover pivots in the second pivoting direction from the open position.

In a reading apparatus according to another embodiment, the reading unit is of a contact image sensor type.

In another embodiment, a reading apparatus includes a cover configured to pivot to an open position and a closed position, a lock mechanism configured to restrict the cover in the closed position from pivoting to the open position, and a reading unit provided in the cover or in a member facing the cover in the closed position, and configured to read a medium when the cover is in the closed position. The cover includes a protruding portion. The lock mechanism includes a latch configured to move to a lock position, in which the latch is configured to engage with the protruding portion, and to a lock release position in which the latch does not engage with the protruding portion. The latch includes a latch face configured to come into contact with a face of the protruding portion facing toward one direction along a first axis when the cover is in a closed position, the first axis being orthogonal to a pivoting shaft of the cover. The latch face is configured to move in the other direction along the first axis when the latch moves from the lock release position to the lock position.

In a reading apparatus according to another embodiment, the latch of the reading apparatus is positioned between the protruding portion of the cover being in the closed position and the pivoting shaft of the cover, on the first axis.

In a reading apparatus according to another embodiment, the reading unit of the reading apparatus is of a contact image sensor type.

BRIEF DESCRIPTION OF THE DRAWINGS

The present disclosure will be described with reference to the accompanying drawings, wherein like numbers reference like elements.

DESCRIPTION OF EXEMPLARY EMBODIMENTS

Hereinafter, a reading apparatus 1 according to an example will be described in detail with reference to the appended drawings.

First, an overview of the reading apparatus 1 according to Example 1 will be described with reference to FIG. 1 and FIG. 2.

Figure 1:
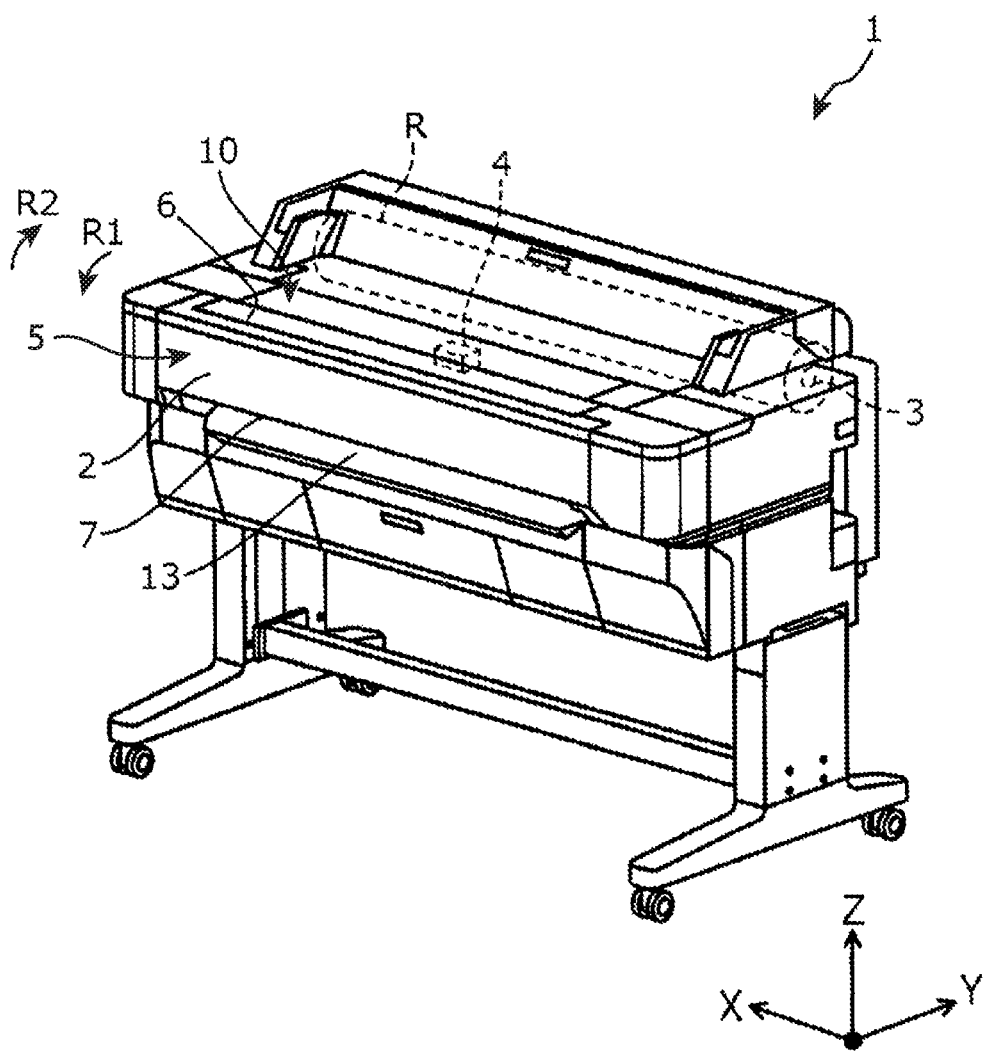
FIG. 1 is a schematic perspective view of a reading apparatus described in the present disclosure.
Figure 2:
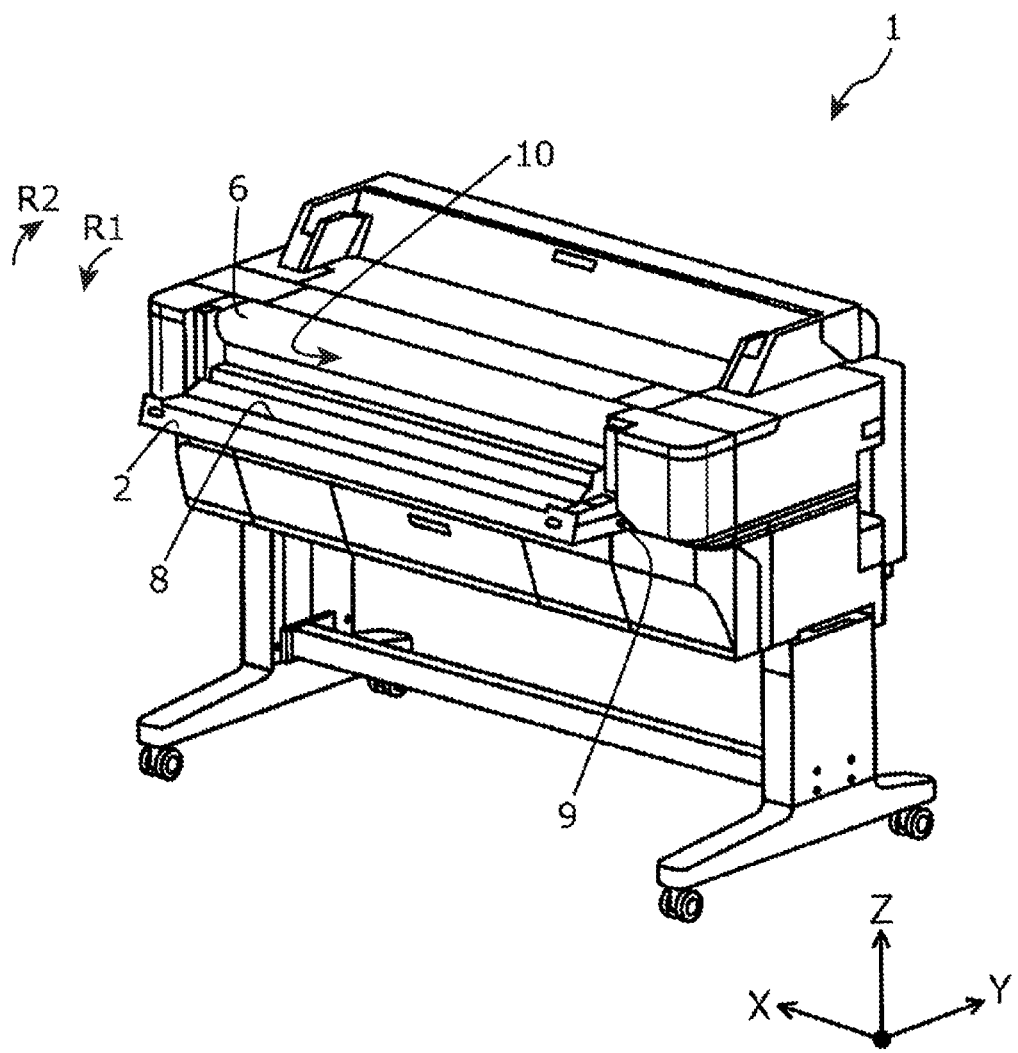
FIG. 2 is a schematic perspective view of a reading apparatus described in the present disclosure.

FIG. 1 and FIG. 2 are schematic perspective views of the reading apparatus 1 according to this example. Of these, FIG. 1 illustrates a state where a cover 2 is in a closed position, and FIG. 2 illustrates a state where the cover 2 is in an open position. Note that, in FIG. 1 and FIG. 2, illustration of some of constituent members are omitted for clarity of an internal configuration.

As illustrated in FIG. 1, the reading apparatus 1 of this example includes a loading portion 3 of a roll R of a target recording medium, a recording head 4 capable of discharging an ink onto the target recording medium and forming an image, and a target recording medium discharging port 13 configured to discharge the target recording medium on which the image was formed by the recording head 4. Additionally, the reading apparatus 1 of this example includes, as illustrated in FIG. 1 and FIG. 2, a scanner unit 5 configured to read a medium serving as a read original. That is, the reading apparatus 1 of this example is configured to be also usable as a recording apparatus and, for example, is configured to be capable of recording an image read from the read original by the scanner unit 5 onto the target recording medium by using the recording head 4.

The scanner unit 5 includes a supplying port 6 configured to supply a medium serving as a read original to an interior of the scanner unit 5, the cover 2 provided with a reading unit 8 of a Contact Image Sensor (CIS) type, and a discharge port 7 configured to discharge the medium read by the reading unit 8. The cover 2 is configured to be movable in a first pivoting direction R1 (direction of opening the cover 2) and a second pivoting direction R2 (direction of closing the cover 2) based on a pivoting shaft 9.

Here, in the figures, an X direction is a horizontal direction and a direction in which the pivoting shaft 9 extends, a Y direction is a horizontal direction and a direction orthogonal to the X direction, and a Z direction is a vertical direction. Additionally, hereinafter, an arrow direction is a + direction, and a direction opposite to the arrow direction is a − direction. For example, a vertical upward direction is a +Z direction, and a vertical downward direction is a −Z direction.

In a configuration of the reading apparatus 1 of this example, the cover 2 is set to a closed state (closed position), a medium is inserted from the supplying port 6 to transport the medium in a position between the cover 2 and a main body 10, an image formed on the medium is read by the reading unit 8 provided in a position between the cover 2 and the main body 10, and the medium is discharged from the discharge port 7.

Next, a lock mechanism 11 of the cover 2 being a main part of the reading apparatus 1 of the example will be described.

Figure 3:
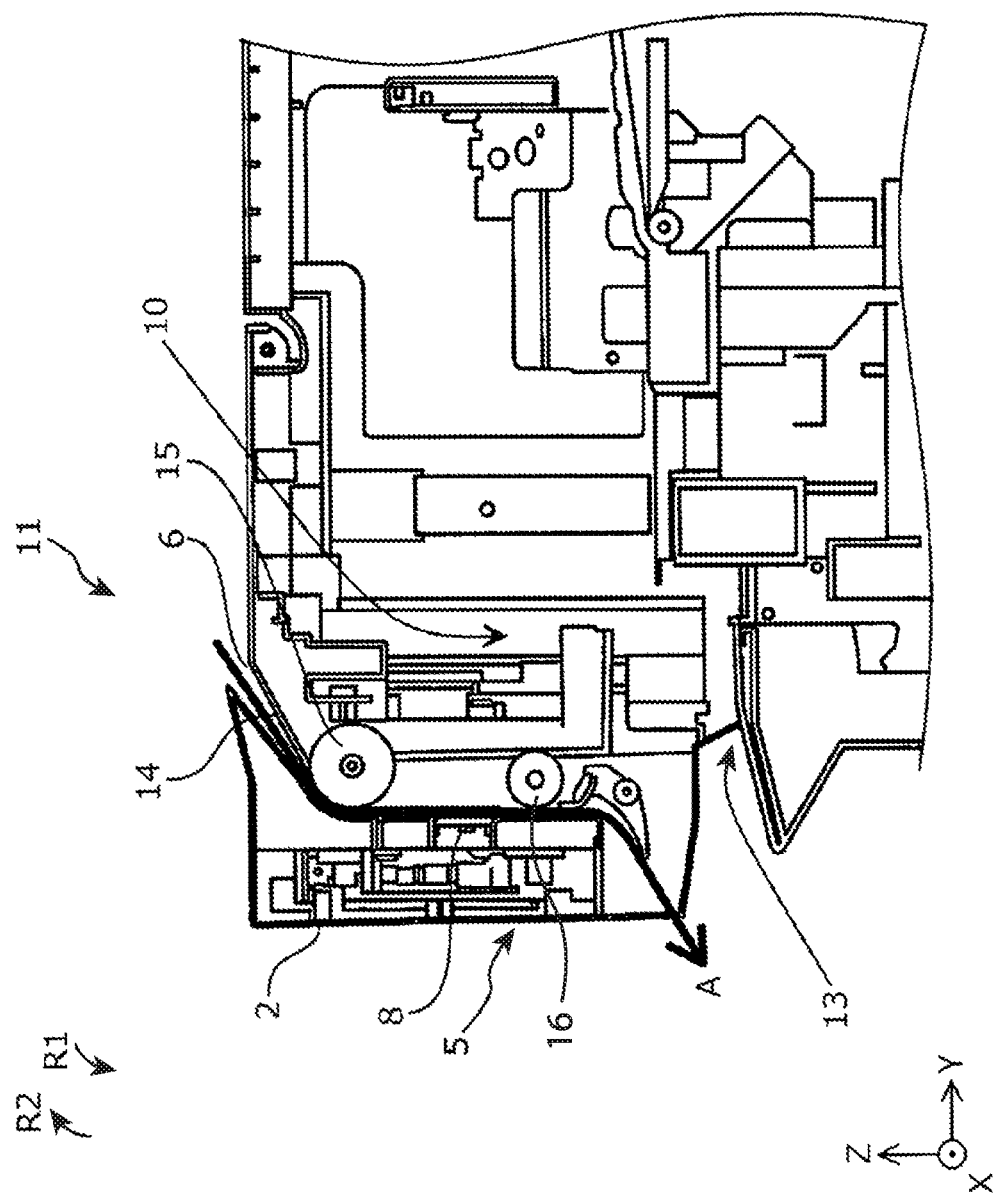
FIG. 3 is a schematic cross-sectional side view of a lock mechanism of a reading apparatus described in the present disclosure.

Here, FIG. 3 is a schematic cross-sectional side view of the lock mechanism 11 of the reading apparatus 1 of the example, and illustrates a state where the cover 2 is in the closed position.

Figure 4:
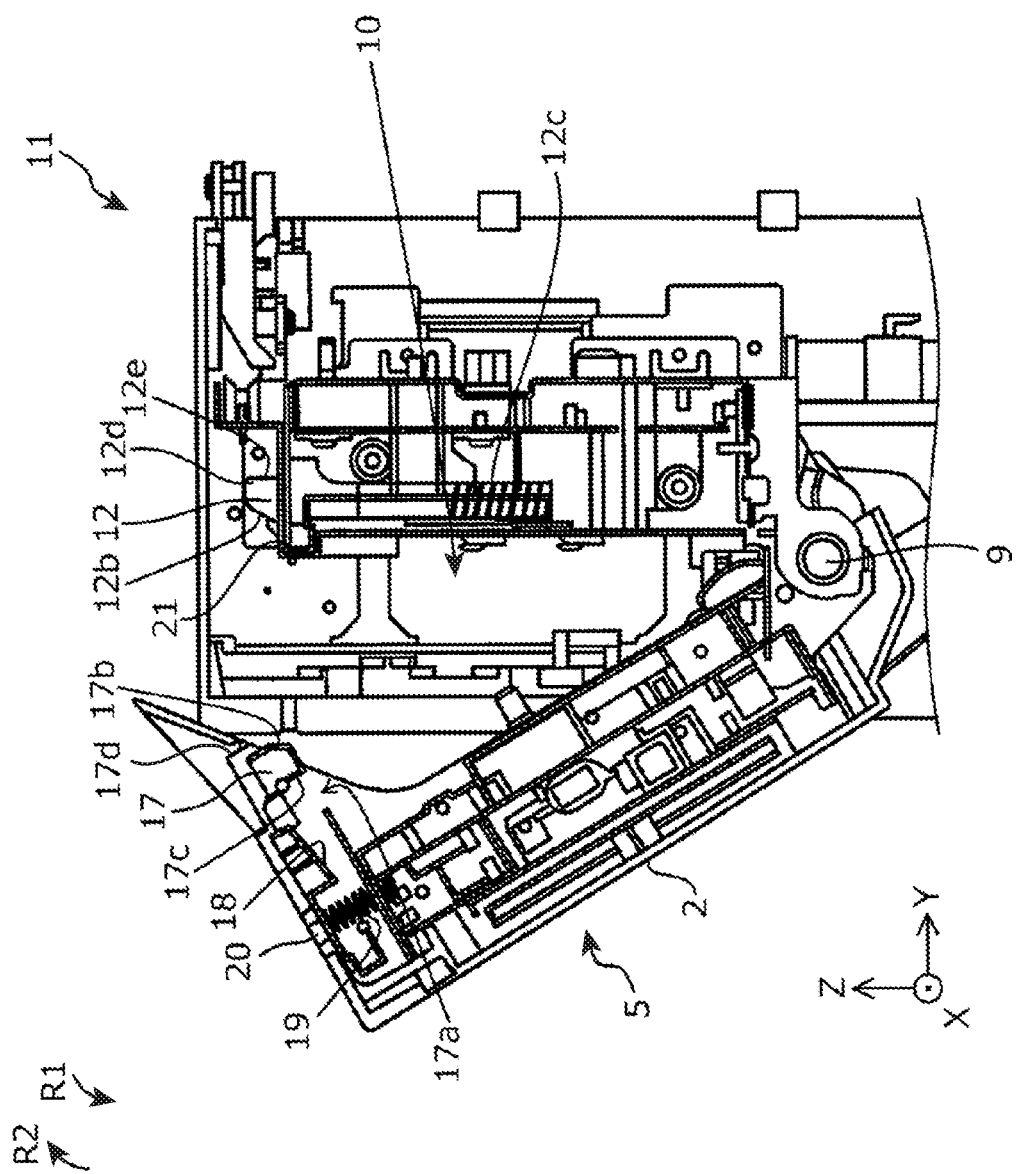
FIG. 4 is an enlarged schematic cross-sectional side view of a lock mechanism of a reading apparatus described in the present disclosure.
Figure 5:
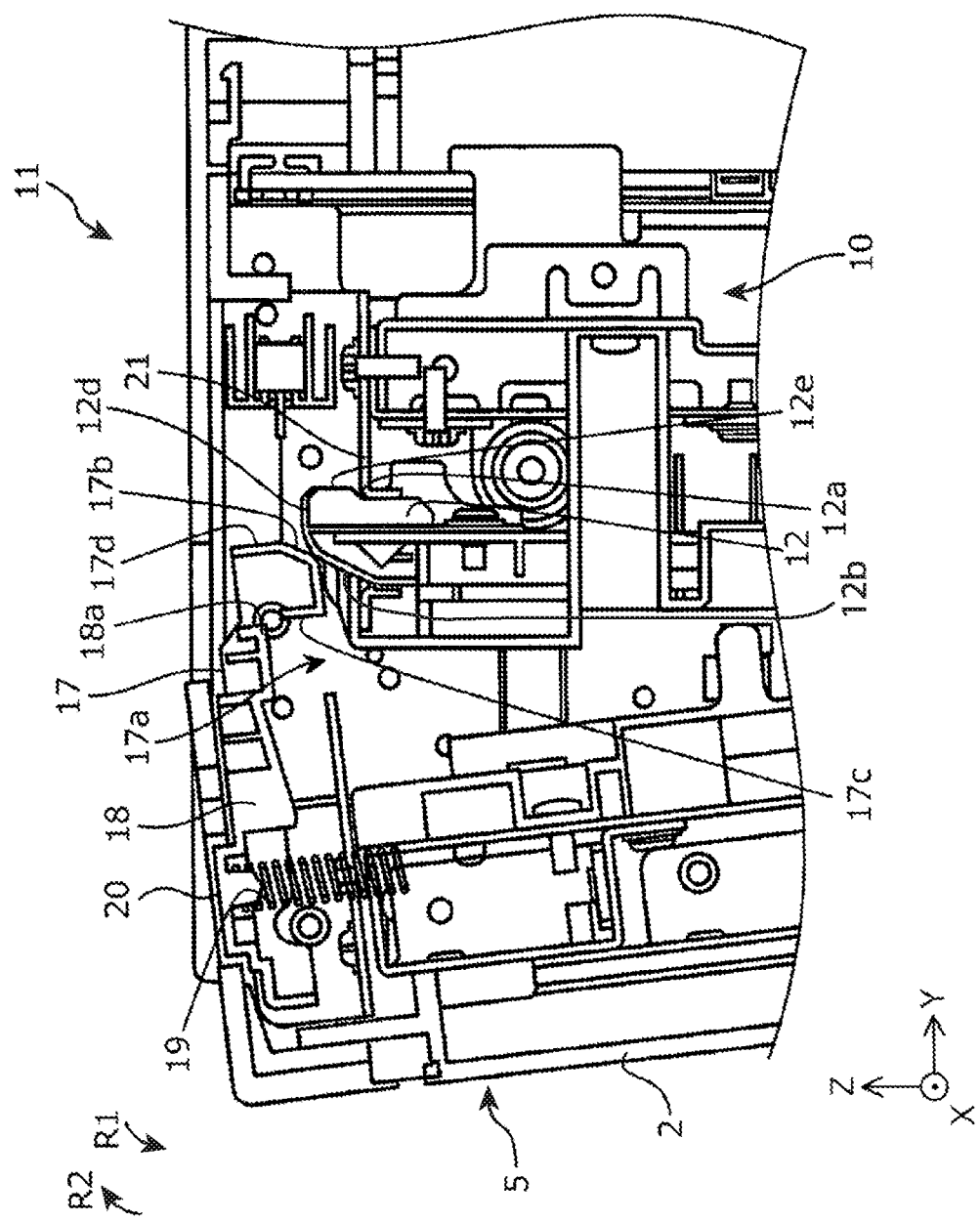
FIG. 5 is an enlarged schematic cross-sectional side view of a lock mechanism of a reading apparatus described in the present disclosure.
Figure 6:
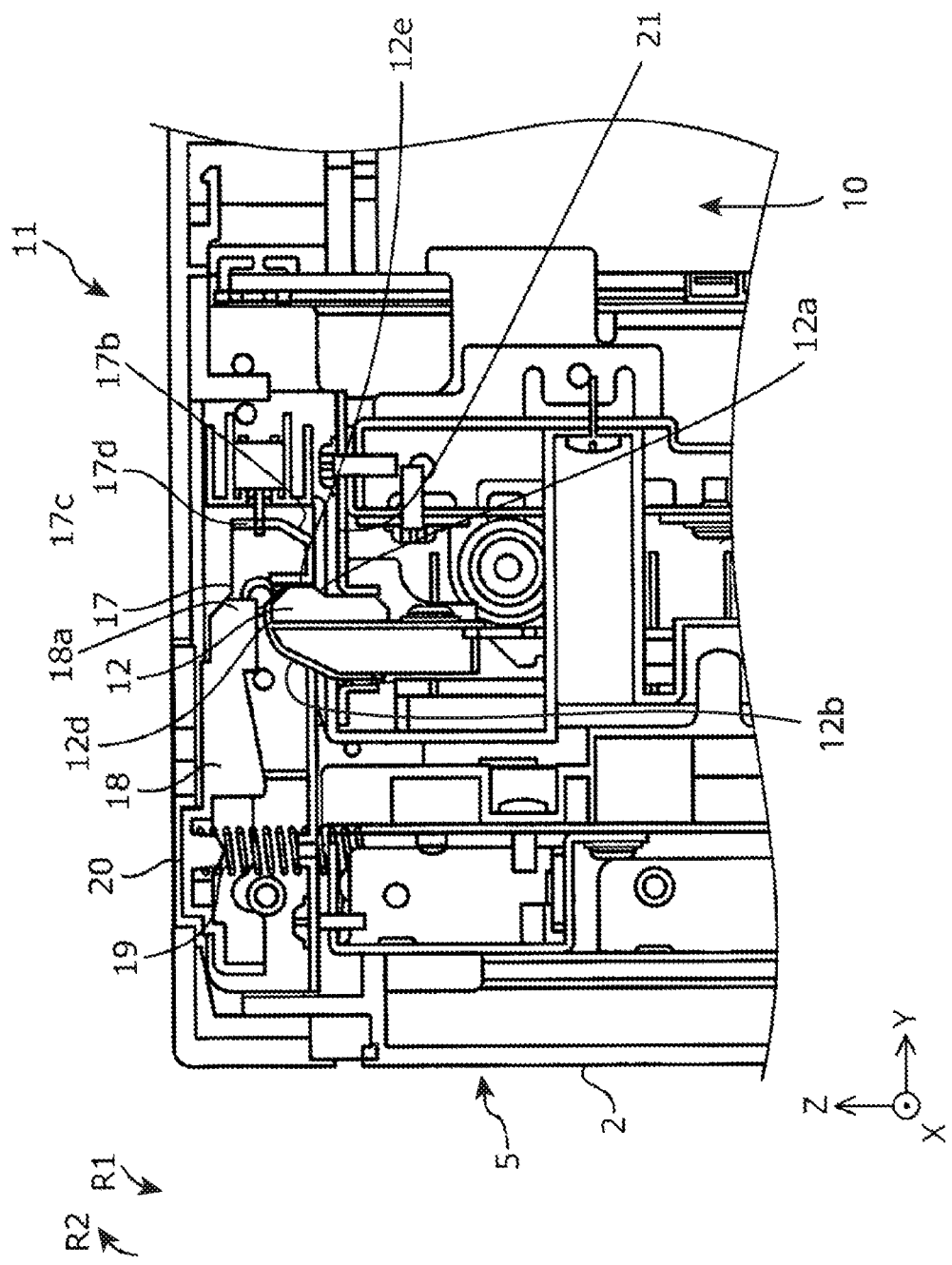
FIG. 6 is an enlarged schematic cross-sectional side view of a lock mechanism of reading apparatus described in the present disclosure.
Figure 7:
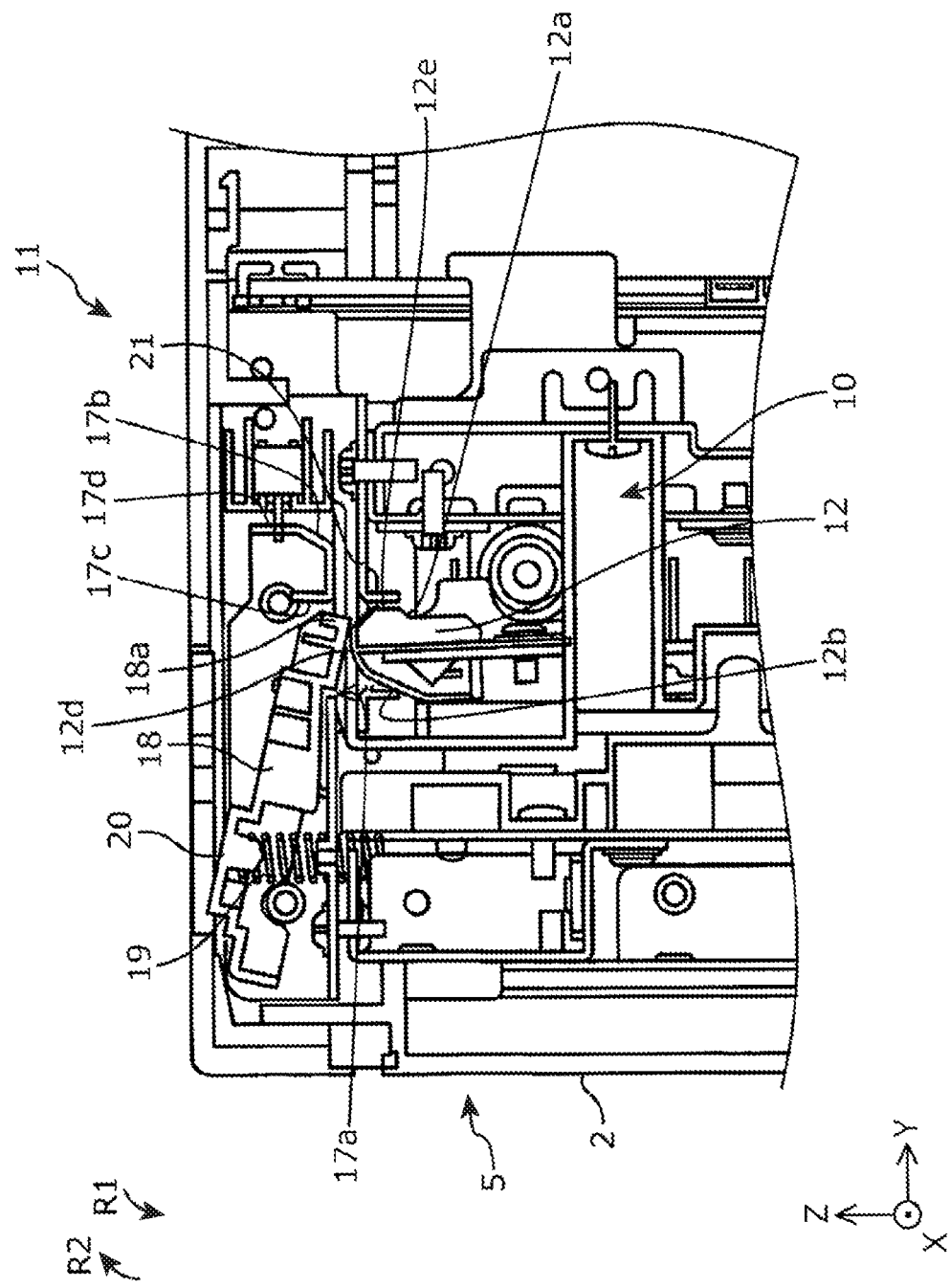
FIG. 7 is an enlarged schematic cross-sectional side view of a lock mechanism of a reading apparatus described in the present disclosure.

Additionally, FIG. 4 to FIG. 7 are enlarged schematic cross-sectional side views of the lock mechanism 11 of the reading apparatus 1 of the example. Of these, FIG. 4 illustrates a state where the cover 2 is in an open position. FIG. 5 illustrates a state where the cover 2 is moved from the state in FIG. 4 in the second pivoting direction R2, and is in a lock operation start position. FIG. 6 illustrates a state where the cover 2 is further moved from the state in FIG. 5 in the second pivoting direction R2 and is in the closed position, and a latch 12 described later is in a lock position. FIG. 7 illustrates a state where the cover 2 is in the closed position, and the latch 12 is in a lock release position.

Note that positions of cross sections (positions of cross sections in the X direction) in FIG. 3 to FIG. 7 do not coincide with each other in the respective figures and, in FIG. 3 to FIG. 7, illustration of some of constituent members are omitted for clarity of an internal configuration.

Figure 8:
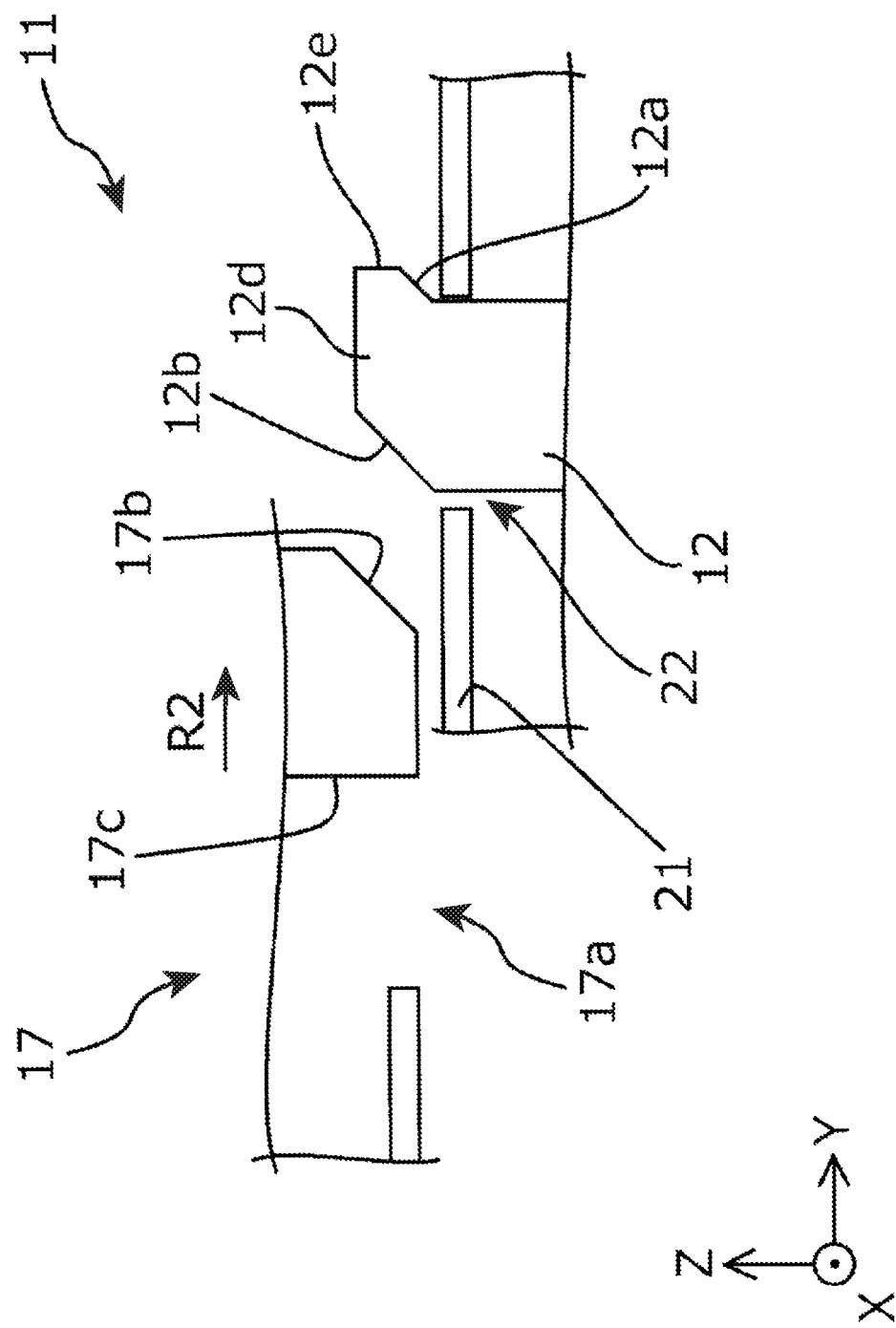
FIG. 8 is a schematic view for explaining an operation of a lock mechanism of a reading apparatus described in the present disclosure.
Figure 9:
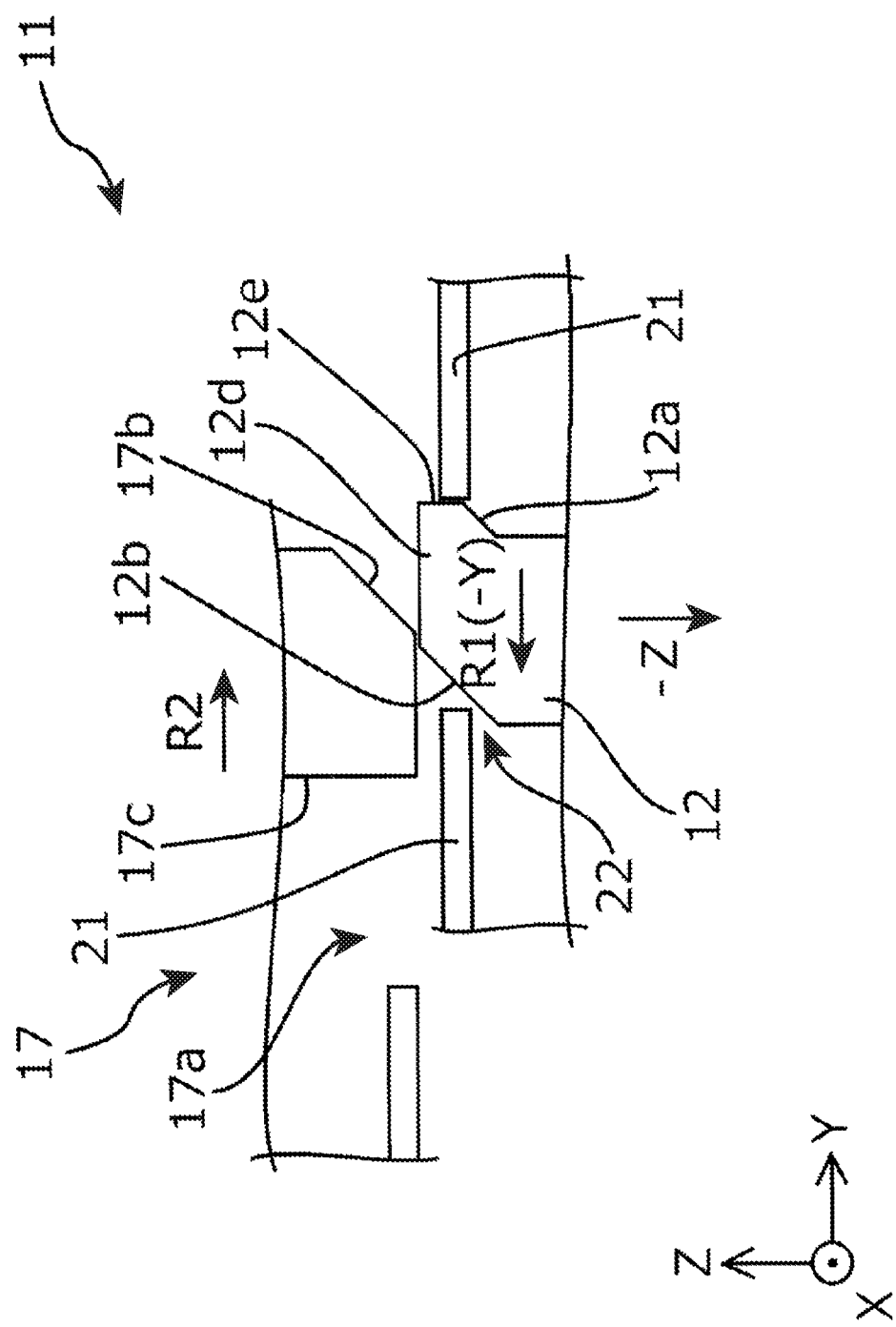
FIG. 9 is a schematic view for explaining an operation of a lock mechanism of a reading apparatus described in the present disclosure.
Figure 10:
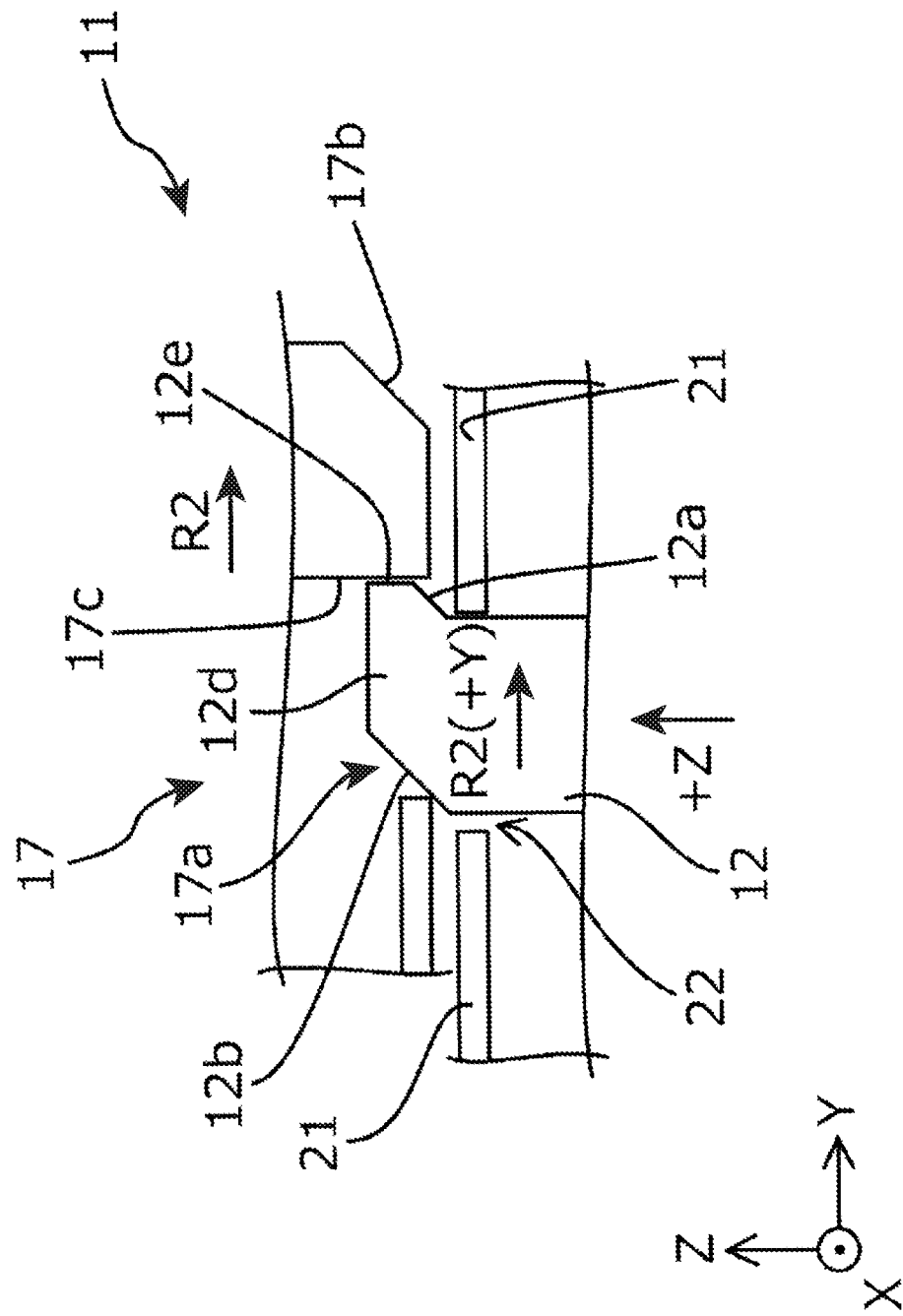
FIG. 10 is a schematic view for explaining an operation of a lock mechanism of a reading apparatus described in the present disclosure.

Additionally, FIG. 8 to FIG. 10 are schematic views for explaining an operation of the lock mechanism 11 of the reading apparatus 1 of the example. Of these, FIG. 8 illustrates a state where the cover 2 is in the open position and, precisely, illustrates a state where the cover 2 is in a position between the state illustrated in FIG. 4 and the state illustrated in FIG. 5. FIG. 9 illustrates a state where the cover 2 is in a position between the state illustrated in FIG. 5 and the state illustrated in FIG. 6. FIG. 10 illustrates a state where the cover 2 is in the closed position, and the state where the cover 2 is in the state illustrated in FIG. 6.

The scanner unit 5 of the reading apparatus 1 of the example is configured to be capable of reading a medium in a state where the cover 2 is in a closed position such as illustrated in FIG. 3. As illustrated in FIG. 3, in a state where the cover 2 is in the closed position, a gap between the cover 2 and the main body 10 is formed, and this gap constitutes a transport path 14 of the medium. In the transport path 14, a roller 15, a roller 16, and the like are formed as a transport portion configured to transport the medium. The medium supplied from the supplying port 6 is transported in a transport direction A by the transport portion, and discharged from the discharge port 7.

Additionally, as illustrated in FIG. 3, the reading unit 8 of a contact image sensor type is formed on the cover 2 side of the transport path 14, in the vicinity of an intermediate section of the transport path 14 in the transport direction A. Note that, while the scanner unit 5 of this example includes the configuration in which the reading unit 8 is formed on the cover 2 side of the transport path 14, the reading unit 8 may be provided on the main body 10 side of the transport path 14.

Additionally, as illustrated in FIG. 4, the scanner unit 5 is configured to enable the cover 2 to move in the first pivoting direction R1 and the second pivoting direction R2 based on the pivoting shaft 9 extending in the X direction. Note that, while FIG. 4 illustrates a view with the cover 2 opened about 30°, the cover 2 can be opened substantially 90°, as illustrated in FIG. 2.

As illustrated in FIG. 4, the cover 2 is provided with an engaging portion 17 protruding in the second pivoting direction R2, and the main body 10 is provided with the latch 12. The latch 12 is movable along the Z direction. The latch 12 is provided with a spring 12c, and a leading end 12d is pressed to an upward side in the vertical direction by a spring pressure of the spring 12c. In other words, in a configuration of the latch 12, the leading end 12d is pressed to a lower side from a state where the latch 12 is in the lock position (refer to FIG. 4, FIG. 6, FIG. 8, and FIG. 10) by force stronger than the spring pressure of the spring 12c and thus, the leading end 12d moves to the lower side (refer to FIG. 5, FIG. 9, and FIG. 7 illustrating a state where the latch 12 is in the lock release position). Additionally, the engaging portion 17 is provided with an engaging recessed portion 17a serving as a recessed portion to which the latch 12 (leading end 12d) can be inserted.

Additionally, as illustrated in FIG. 4 to FIG. 7, an inclined face 17b is formed on a leading side in the second pivoting direction R2 of the engaging portion 17, and an inclined face 12b is formed on a leading side in the first pivoting direction R1 of the latch 12. As illustrated in FIG. 5, inclined directions of the inclined face 17b and the inclined face 12b are inclined directions enabling force in the second pivoting direction R2 acting on the latch 12 as a result of contact between the engaging portion 17 and the latch 12 in association with the cover 2 pivoting in the second pivoting direction R2 (refer to FIG. 5 and FIG. 9) from a state where the cover 2 is in the open position (refer to FIG. 4 and FIG. 8) to escape toward the lower side.

Note that the inclined face 17b and an engaging face 17c of the engaging portion 17 of this example include a metal. Thus, the leading end 12d of the latch 12 coming into contact with the engaging portion 17 includes a resin to reduce a sound associated with contact with the engaging portion 17. On the other hand, portions other than the leading end 12d of the latch 12 include a metal to ensure strength.

The scanner unit 5 includes such a configuration and as a result, in association with the cover 2 pivoting from the open position to the closed position, the inclined face 17b comes into contact with the inclined face 12b, and the latch 12 temporarily moves vertically downward (−Z direction) (the state illustrated in FIG. 4 to the state illustrated in FIG. 5, for example), and when a position of the engaging recessed portion 17a in the second pivoting direction R2 (or the Y direction) arrives at a position where the latch 12 exists (the state illustrated in FIG. 6), the latch 12 moves vertically upward (+Z direction) and the latch 12 and the engaging recessed portion 17a engage.

Note that, when the latch 12 and the engaging portion 17 (engaging recessed portion 17a) engage, specifically a latch face 12e (face facing the leading side in the second pivoting direction R2) of the latch 12 (leading end 12d) faces an engaging face 17c (face facing the leading side in the first pivoting direction R1) of the engaging recessed portion 17a.

Additionally, as illustrated in FIG. 4 to FIG. 7, a lever 18 including a leading end 18a pressed toward the vertically upward (+Z direction) side by a spring 19 is provided in an interior of the engaging portion 17. As illustrated in FIG. 7, a position of the leading end 18a corresponds with a position of the engaging recessed portion 17a and, the leading end 18a is configured to lower to the lower side by pressing of a button 20 and protrude outside the engaging recessed portion 17a. The scanner unit 5 in this example is provided with the lever 18 including such a configuration and as a result, the scanner unit 5 is configured to enable, in a state where the cover 2 is in the closed position, the leading end 18a to be pressed against the leading end 12d by pressing of the button 20, and enable the latch 12 to be pressed downward to the lower side (enable the latch 12 to move to the lock release position). That is, a user pivots the cover 2 locked in the closed position in the first pivoting direction R1 while pressing the button 20 and thus, the user can simply pivot the cover 2 to the open position.

Next, detailed operation of the latch 12 in association with the locking of the cover 2 will be further described with reference to FIG. 8 to FIG. 10.

As illustrated in FIG. 8 to FIG. 10, in a configuration of the latch 12, the leading end 12d protrudes vertically upward (+Z direction) from a base hole 22 provided in a base 21 (refer to FIG. 8 and FIG. 10) and recesses inside the base hole 22 (refer to FIG. 9), and thus the latch 12 is movable to the lock position and to the lock release position.

As illustrated in FIG. 8, when the engaging portion 17 is in a position where the engaging portion 17 does not come into contact with the latch 12 in the state where the cover 2 is in the open position, the leading end 12d of the latch 12 protrudes from the base 21. The latch 12 in this example is also provided with an inclined face 12a substantially parallel with the inclined face 12b on the side opposite to the inclined face 12b side of the leading end 12d.

Thus, as illustrated in FIG. 9, in association with the cover 2 pivoting in the second pivoting direction R2 from a state where the engaging portion 17 (inclined face 17b) is in contact with the latch 12 (inclined face 12b), the latch 12 is pressed downward (moves in the −Z direction) while the inclined face 12a is in contact with the base 21 on the inclined face 12a side. Accordingly, in association with the cover 2 pivoting in the second pivoting direction R2, the latch 12 is pressed downward while moving in the first pivoting direction R1 (−Y direction). Then, when the cover 2 is further pivoted in the second pivoting direction R2 from the state illustrated in FIG. 9, the latch 12 is pressed upward (moves in the +Z direction) by force of the spring 12c while moving (while returning) in the second pivoting direction R2 (+Y direction), as illustrated in FIG. 10. That is, when the cover 2 moves from the open position side to the closed position side and the engaging portion 17 (engaging recessed portion 17a) and the latch 12 engage, the latch 12 moves in a direction opposite to the second pivoting direction R2 when the cover 2 moves from a state where the engaging portion 17 and the latch 12 are in contact to the closed position side. Thus, in the lock release position (refer to FIG. 9), the latch 12 is positioned closer to the leading side in the first pivoting direction R1 than in the lock position (refer to FIG. 8 and FIG. 10).

In a general lock mechanism, to lock a pivoting type cover, it is necessary to pivot the cover further in the pivoting direction for locking the cover than the lock position. This is because when the cover is merely caused to pivot in the pivoting direction to the position where the cover is locked, owing to mounting accuracy of components and the like, an engaging portion provided in the cover tends to catch on a target engaging portion such as a latch, provided in the main body.

Nevertheless, as described above, in the configuration of the lock mechanism 11 of this example, in locking of the cover 2, the latch 12 serving as the target engaging portion moves to a front side as viewed from the cover 2 and pulls in the engaging portion 17 provided in the cover 2. Thus, unlike the case where only the cover 2 side is caused to pivot as in the related art, even when a user merely pivots the cover 2 in the pivoting direction to the position where the cover 2 is locked (the position where the engaging recessed portion 17*a* faces the latch 12), the cover 2 readily locks. In other words, a tendency of the cover 2 not locked normally owing to component accuracy and the like reduces.

Here, in summary, the reading apparatus 1 of this example includes the cover 2 configured to pivot to the open position and the closed position, the lock mechanism 11 of the cover 2 configured to restrict the cover 2 from pivoting in the first pivoting direction R1 toward the open position in a state where the cover 2 is in the closed position, and the reading unit 8 provided in the cover 2 (may be provided in a position on the main body 10 facing the cover 2 in a state where the cover 2 is in the closed position) and configured to read a medium in a state where the cover 2 is in the closed position).

Then, the cover 2 includes the engaging portion 17 protruding in the second pivoting direction R2 being a direction opposite to the first pivoting direction R1.

Additionally, the lock mechanism 11 includes the latch 12 configured to move in the intersecting direction (Z direction) intersecting a direction (X direction) in which the pivoting shaft 9 of the cover 2 extends to move to a lock position in which the latch 12 is configured to engage with the engaging recessed portion 17*a* of the engaging portion 17, and a lock release position in which the latch does not engage with the engaging recessed portion 17*a* of the engaging portion 17.

Here, the latch 12 includes the latch face 12*e* configured to, in the state where the cover 2 is in the closed position, come into contact with the engaging face 17*c* facing the leading side in the first pivoting direction R1 of the engaging recessed portion 17*a*. Then, in association with the cover 2 pivoting in the second pivoting direction R2 and transitioning from a state where the cover 2 is in the open position to the closed position, the latch 12 moves in the intersecting direction (+Z direction) and also moves to the leading side in the first pivoting direction R1 (that is, in the −Y direction on the side opposite to the latch face 12*e*).

Thus, in the reading apparatus 1 of this example, the engaging portion 17 protruding in the second pivoting direction R2 toward the closed position is provided in the cover 2, and the latch 12 configured to move in the intersecting direction intersecting the pivoting shaft direction of the cover 2 and being engageable with the engaging recessed portion 17*a* of the engaging portion 17 is provided in the lock mechanism 11. Then, in locking of the cover 2, the latch 12 moves in the intersecting direction and also moves to the leading side in the first pivoting direction R1 toward the open position. That is, in locking of the cover 2, the latch 12 not only moves in the intersecting direction being the locking direction, but also moves in a direction (first pivoting direction R1) opposite to the moving direction (second pivoting direction R2) of the cover 2. Thus, the reading apparatus 1 of this example is capable of locking the cover 2 without temporarily pressing the cover 2 in the second pivoting direction R2 beyond a formation position of the latch 12 to lock the cover 2. Accordingly, even when a space inside the apparatus is narrow, the cover 2 can be locked in a stable manner with favorable operability.

Note that the "latch 12 . . . moves to the leading side in the first pivoting direction R1" means that the latch 12 may be configured to move in a direction slightly shifted from the leading direction in the first pivoting direction R1 in a strict sense.

Additionally, the movement of the latch 12 to the leading side in the first pivoting direction R1 in the exemplary embodiment is not limited to a configuration in which the latch 12 entirely moves. An example of the "movement of the latch 12 to the leading side in the first pivoting direction R1" includes a configuration in which only an end portion on the intersecting direction (+Z direction) side of the latch face 12*e* moves to the leading side in the first pivoting direction R1 of the latch 12.

Additionally, as illustrated in FIG. 4 to FIG. 7, the engaging recessed portion 17*a* is formed rearward in the second pivoting direction R2 of a leading side end portion 17*d* in the second pivoting direction R2 of the engaging portion 17.

Then, in a state where the cover 2 is in the closed position, the latch 12 is provided in a position between the pivoting shaft 9 of the cover 2 and the leading side end portion 17*d* in a direction (Y direction) intersecting both the pivoting shaft direction of the cover 2 and the intersecting direction. The latch 12 is in such disposition and thus, the cover 2 can be locked effectively.

Additionally, according to such disposition of the latch 12, the pivoting shaft 9, and the leading side end portion 17*d*, when the cover 2 moves in the first pivoting direction R1, the movement of the leading side end portion 17*d* includes a movement component in the intersecting direction (+Z direction). Thus, in a configuration in which play is provided between the latch face 12*e* and the engaging face 17*c* in the Y direction when the latch 12 is in the lock position to ensure operability when the cover 2 is caused to move to the closed position, the leading side end portion 17*d* tends to move in the +Z direction, and the latch 12 and the engaging recessed portion 17*a* tend to disengage. Accordingly, a mechanism in which when the latch 12 moves to the lock release position, the latch 12 moves to the leading side in the first pivoting direction R1 (−Y direction) is particularly effective as a mechanism achieving both operability in moving the cover 2 to the closed position and retention of the cover 2 in the closed position.

Additionally, as described above, the inclined face 17*b* configured to cause force in the second pivoting direction R2 acting on the latch 12 as a result of contact between the engaging portion 17 and the latch 12 in association with the cover 2 pivoting in the second pivoting direction R2 from a state where the cover 2 is in the open position to escape toward the lock release position side (lower side) is formed on the leading side in the second pivoting direction R2 of the engaging portion 17.

According to such a configuration, when the cover 2 is caused to move from a state where the cover 2 is in the open position to the closed position, the inclined face 17*b* is temporarily brought into contact with the latch 12 to move the latch 12 from the lock position to the lock release position, and in association with the cover 2 moving into the closed position (in association with the engaging recessed portion 17*a* arriving at a position of the latch 12), the latch 12 is caused to move from the lock release position to the lock position, and the cover 2 can be locked. Thus, the cover 2 can be locked with favorable operability.

Additionally, as described above, the inclined face 12b configured to cause force in the second pivoting direction R2 acting on the latch 12 as a result of contact between the engaging portion 17 and the latch 12 in association with the cover 2 pivoting in the second pivoting direction R2 from a state where the cover 2 is in the open position to escape toward the lock release position side is also formed on the side opposite to the latch face 12e side of the latch 12 (the leading side in the first pivoting direction R1).

According to such a configuration, when the cover 2 is caused to move from a state where the cover 2 is in the open position to the closed position, the inclined face 12b is temporarily brought into contact with the engaging portion 17 to move the latch 12 from the lock position to the lock release position, and in association with the cover 2 moving into the closed position (in association with the engaging recessed portion 17a arriving at a position of the latch 12), the latch 12 is caused to move from the lock release position to the lock position, and the cover 2 can be locked. Thus, the cover 2 can be locked with favorable operability.

Note that the inclined face 17b and the inclined face 12b may be flat faces, or may be curved faces.

Additionally, as described above, the reading unit 8 of this example is a contact image sensor type reading unit.

Generally, a contact image sensor type reading unit has reading performance decreasing when the distance between the reading unit and a medium serving as a read original excessively increases. Thus, the reading unit 8 of a contact image sensor type can be used in the reading apparatus 1 of this exemplary embodiment enabling the cover 2 to be stably locked and capable of effectively suppressing an excessive increase in the distance between the reading unit and the medium and thus, a decrease in reading performance associated with the use of the reading unit 8 of a contact image sensor type can be suppressed effectively.

Note that the above described embodiments is not limited to the aforementioned example, and many variations are possible within the scope of the invention as described in the appended claims. It goes without saying that such variations also fall within the scope of the invention.

Next, Example 2 will be described.

First, another issue related to the image scanner described in JP-A-2011-130161 will be described. In the image scanner described in JP-A-2011-130161, since a lock lever is guided along a circumferential surface of a lock pin to a lock position, operability in engagement of the lock pin and the lock lever is easy.

Nevertheless, since the lock pin has a cylinder shape, there has been an issue of the lock lever that readily comes off the lock pin depending on a direction of outer force applied to the lock lever.

Thus, in Example 2, description will be made on a configuration in which, in a reading apparatus 1A including a cover 2 configured to pivot to an open position and a closed position, improvement in operability when a user moves the cover 2 from the open position to the closed position, and improvement in stability when the cover 2 being in the closed position is locked without being readily disengaged can be achieved. Note that configurations in this example same as those in Example 1 are denoted by the same reference signs.

The reading apparatus 1A includes the cover 2 configured to pivot to the open position and the closed position, a lock mechanism 11 configured to restrict the pivoting of the cover 2, which is in the closed position, from pivoting to the open position, and a reading unit 8 configured to read a medium when the cover 2 is in the closed position. The reading unit is provided in the cover 2 or in a member facing the cover 2 being in the closed position. Here, since basic configurations of the cover 2 and the lock mechanism 11 are the same as the configurations in Example 1, description of such configurations will be omitted.

Additionally, the reading unit 8 is of a contact image sensor type, as with Example 1. Thus, for example, as compared to a Charge Coupled Device (CCD) type reading unit, miniaturization becomes possible. Accordingly, miniaturization of the reading apparatus 1A can be achieved.

Figure 11:
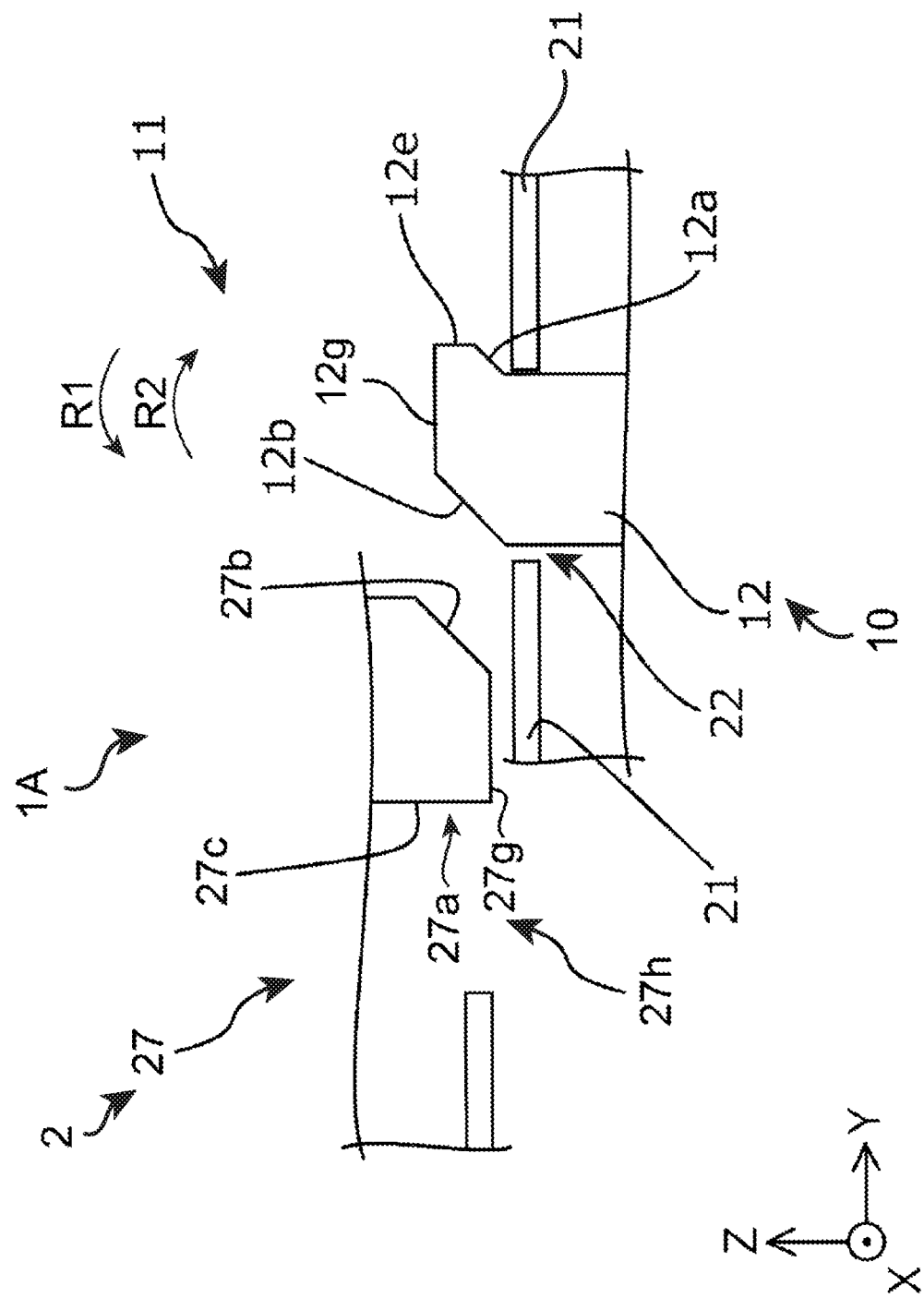
FIG. 11 is a schematic view for explaining an operation of a lock mechanism of a reading apparatus described in the present disclosure.
Figure 12:
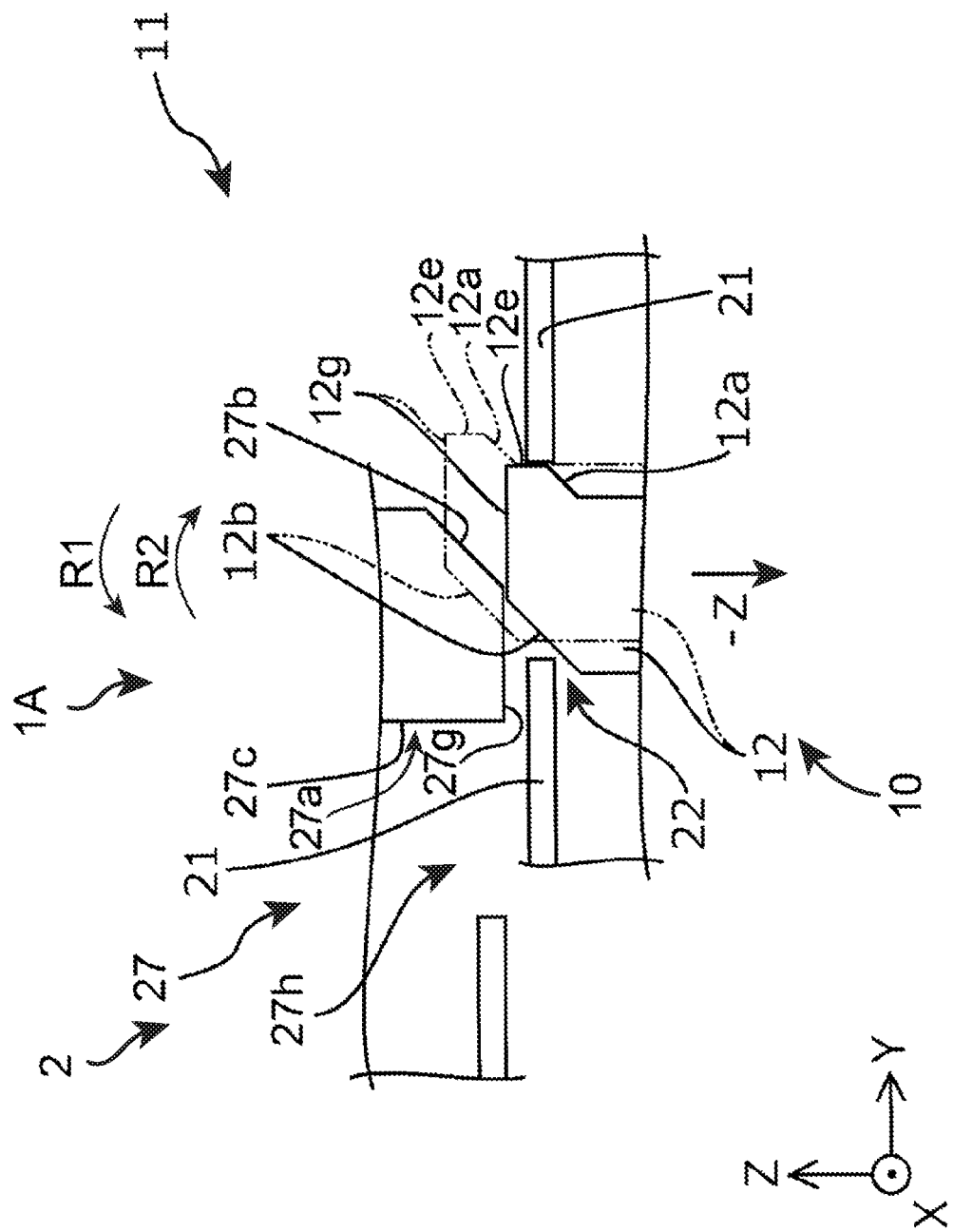
FIG. 12 is a schematic view for explaining an operation of a lock mechanism of a reading apparatus described in the present disclosure.
Figure 13:
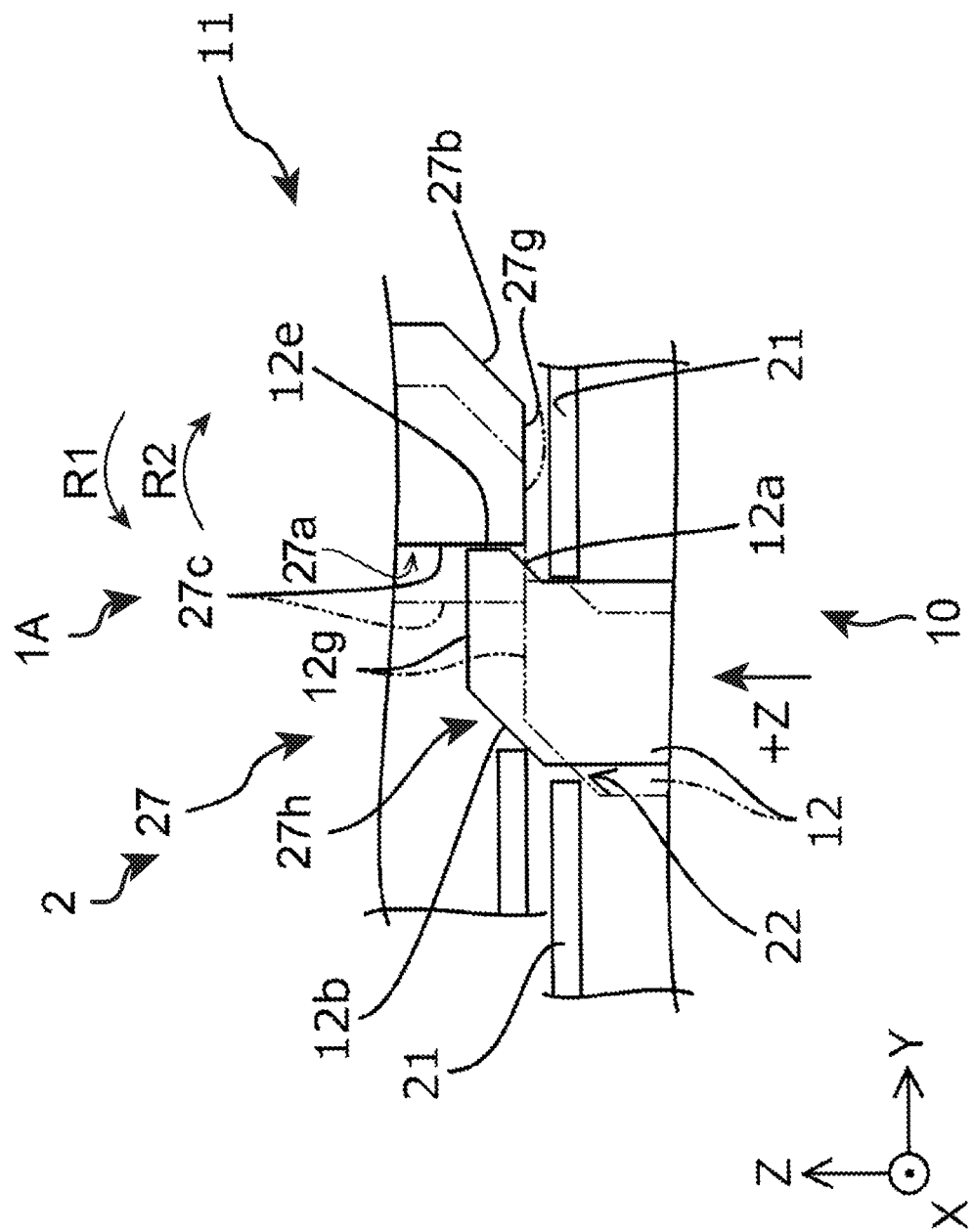
FIG. 13 is a schematic view for explaining an operation of a lock mechanism of a reading apparatus described in the present disclosure.

FIG. 11 to FIG. 13 are schematic views for describing an operation of the lock mechanism 11 of the reading apparatus 1A according to the example. Specifically, FIG. 11 illustrates a state where the cover 2 is in the open position. When the cover 2 is in the open position, the cover 2 and the lock mechanism 11 are separated. FIG. 12 illustrates a state where a latch 12 is in a lock release position in a process in which the cover 2 and the lock mechanism 11 engage.

FIG. 13 illustrates a state where the latch 12 is in a lock position in a state where the cover 2 and the lock mechanism 11 are engaged.

As illustrated in FIG. 11, a main body 10 of the reading apparatus 1A is provided with the lock mechanism 11. The lock mechanism 11 is provided with the latch 12. The latch 12 is a block member. The latch 12 is supported by a spring 12c (refer to FIG. 4) disposed in the −Z direction of the latch 12. The latch 12 is urged in the +Z direction by a spring pressure of the spring 12c. The latch 12 is pressed in the −Z direction by force stronger than the spring pressure of the spring 12c and thus, the latch 12 moves in the −Z direction. On the other hand, the pressing in the −Z direction on the latch 12 is released and thus, the latch 12 moves in the +Z direction. The latch 12 becomes movable along the Z axis via a base hole 22 provided in a base 21.

A top face 12g being flat and substantially orthogonal to the Z axis is formed on a +Z direction end portion of the latch 12. A latch face 12e is formed on a +Y direction end portion of the latch 12. The latch face 12e is a flat face substantially orthogonal to the Y axis. An inclined face 12a is formed further on the −Z direction side from a −Z direction end portion of the latch face 12e. The inclined face 12a is a flat face extending from the −Z direction end portion of the latch face 12e along a direction including a −Z direction component and a −Y direction component. Additionally, an inclined face 12b is formed on the side opposite to the latch face 12e on the Y axis. The inclined face 12b is a flat face extending from a −Y direction end portion of the top face 12g along a direction including a −Z direction component and a −Y direction component. The inclined face 12a and the inclined face 12b are substantially parallel. Here, in a state where the cover 2 and the lock mechanism 11 are separated, the top face 12g, the latch face 12e, the inclined face 12a, and the inclined face 12b are positioned in the +Z direction from the base 21.

The cover 2 of the reading apparatus 1A includes an engaging portion 27. The engaging portion 27 protrudes from the cover 2 in a second pivoting direction R2 of the cover 2. The engaging portion 27 is a member configured to engage the latch 12.

As illustrated in FIG. 13, the engaging portion 27 includes a protruding portion 27a protruding in a direction intersecting a first pivoting direction R1 and the second pivoting direction R2 of the cover 2. In the protruding portion 27a, on the Y axis serving as a first axis orthogonal to a pivoting shaft 9 of the cover 2, an engaging face 27c is formed on the −Y direction side being one side of the Y axis of the protruding portion 27a of the cover 2 being in the closed position, so that the engaging face 27c faces toward −Y direction. In a state where the cover 2 is in the closed position, that is, in a state where the latch 12 is in the lock position, the latch face 12e of the latch 12 and the engaging face 27c come into contact. In the other words, the lock position is a position in which the latch 12 is configured to engage with the protruding portion 27. In a state where the latch 12 is in the lock position, the engaging face 27c of the protruding portion 27a is a flat face substantially orthogonal to the Y axis. Additionally, in FIG. 13, a top face 27g being flat and substantially orthogonal to the Z axis is formed on a −Z direction end portion of the protruding portion 27a. Additionally, in the protruding portion 27a, an inclined face 27b is formed on a side opposite to the engaging face 27c on the Y axis. The inclined face 27b is a flat face extending from a +Y direction end portion of the top face 27g along a direction including a +Z direction component and a +Y direction component. Additionally, a recessed portion 27h capable of accommodating the latch 12 when the latch 12 and an engaging portion 27 are engaged is provided in the −Y direction of the protruding portion 27a of the cover 2.

Next, an operation of the lock mechanism 11 of the reading apparatus 1A will be described in detail.

As illustrated in FIG. 11, in a state where the cover 2 is in the open position and the engaging portion 27 and the latch 12 are not in contact, the top face 12g, the latch face 12e, the inclined face 12a, and the inclined face 12b of the latch 12 protrude from the base 21 via the base hole 22 in the +Z direction.

Next, FIG. 12 illustrates a state where the latch 12 and the engaging portion 27 are not engaged and a state where the latch 12 is in the lock release position, in which the latch does not engage with the engaging portion 27. That is, the lock release position of the latch 12 refers to a position in which the latch 12 is in a state where when the cover 2 is caused to pivot in the second pivoting direction R2 from a state where the cover 2 is in the open position, the latch 12 is pressed in the −Z direction by the engaging portion 27.

As illustrated in FIG. 12, in association with the cover 2 pivoting in the second pivoting direction R2 from the open position toward the closed position, the inclined face 12b of the latch 12 and the inclined face 27b of the engaging portion 27 come into contact, and the engaging portion 27 presses the latch 12 in the −Z direction. At this time, the inclined face 12a moves while coming into contact with a peripheral end portion of the base hole 22 in the base 21. Thus, the latch 12 moves in the −Z direction and also moves in the −Y direction. This operation efficiently assists an operation until engagement of the engaging portion 27 and the latch 12. In other words, operability until the cover 2 transitions from the open position to the closed position is improved. More specifically, when the cover 2 pivots in the second pivoting direction R2 from the open position to the closed position, the cover 2 is not restricted from pivoting in the first pivoting direction R1 until the protruding portion 27a is in a position in the +Y direction from the latch 12. In the example, in a state where the engaging face 27c of the protruding portion 27a is in a position that is in the −Y direction from the latch face 12e of the latch 12, the cover 2 is not restricted from pivoting in the first pivoting direction R1. Accordingly, because the latch 12 moves in the −Y direction, a movement amount of the cover 2 in pivoting in the first pivoting direction R1 necessary for transitioning to a state where the cover 2 is restricted from pivoting in the pivoting direction R1 is small as compared to the necessary movement amount of the cover 2 in a configuration in which the latch 12 does not move in the −Y direction. The cover 2 is restricted from pivoting in the first pivoting direction R1 and thus, it becomes easier for a user to move the cover 2 in the second pivoting direction R2. Thus, moving the latch 12 in the −Y direction assists an operation by a user for engagement of the engaging portion 27 and the latch 12.

Additionally, for example, when the face of the latch 12 coming into contact with the engaging portion 27 is not the inclined face 12b, but is a flat face orthogonal to the Y axis and continuous from the −Y direction end portion of the top face 12g, and further the face of the engaging portion 27 coming into contact with the latch 12 is not the inclined face 27b, but is a flat face orthogonal to the Y axis and continuous from the +Y direction end portion of the top face 27g, the latch 12 does not easily move in the −Z direction, and an operation until engagement of the engaging portion 27 and the latch 12 is difficult.

According to the example, at the time when the latch 12 and the engaging portion 27 come into contact, the latch 12 is caused to move in the −Z direction by the pressing by the engaging portion 27. Thus, the latch 12 is readily caused to move to the lock release position. Accordingly, an operation until engagement of the engaging portion 27 and the latch 12 becomes easy.

In a state where, in the lock release position of the example, the latch 12 is moved as far as possible in the −Z direction, the latch face 12e is retained in a state where the latch face 12e is in contact with an inner peripheral face of the base hole 22 of the base 21.

Then, as illustrated in FIG. 13, when the cover 2 further pivots in the second pivoting direction R2 from a state where the latch 12 is in the lock release position, the latch 12 moves to the lock position.

Specifically, when the top face 27g of the engaging portion 27 moves in the +Y direction while coming into contact with the top face 12g of the latch 12 in the lock release position, the contact between the top face 27g of the engaging portion 27 and the top face 12g of the latch 12 breaks. When the engaging face 27c of the protruding portion 27a is positioned in the +Y direction of the latch face 12e of the latch 12, the contact between the top face 27g and the top face 12g breaks. When the latch 12 is released from the pressing by the engaging portion 27, the latch 12 moves in the +Z direction by force of the spring 12c. As a result, the latch 12 is caused to move to the lock position and engages the engaging portion 27. More specifically, the latch face 12e is released from a state where the latch face 12e is in contact with the inner peripheral face of the base hole 22 in the base 22 and thus, when the latch 12 moves from the lock release position to the lock position, the latch face 12e and the engaging face 27c of the engaging portion 27 come into contact in a state where the latch face 12e is moved in the +Y direction being the other direction along the Y axis (first axis). That is, a position of the latch face 12e in the lock position is in the +Y direction of a position of the latch face 12e in the lock release position. Then, owing to the transition of the latch 12 to the lock position, the cover 2 transitions to the closed position.

Here, in a configuration in which when the latch 12 is in the lock position, a gap exists between the latch face 12e and the engaging face 27c, for example, when external force in the first pivoting direction R1 is applied to the cover 2, the cover 2 easily moves in the first pivoting direction R1 and a state of the engagement of the latch 12 and the protruding portion 27a is released. Additionally, as in this example in particular, when the reading unit 8 can be provided in the cover 2 or in a member facing the cover 2 being in the closed position, the reading portion 8 is movable in the first pivoting direction R1 or the second pivoting direction R2 by an amount equivalent to the gap between the latch face 12e and the engaging face 27c. Thus, reading accuracy tends to decrease. Additionally, for example, in a configuration in which the latch face 12e or the engaging face 27c is a curved face, contact area between the latch 12 and the protruding portion 27a is reduced and thus, when external force in the first pivoting direction R1 is applied to the cover 2, the cover 2 readily moves in the first pivoting direction R1 and a state of the engagement of the latch 12 and the engaging portion 27 is released.

Therefore, in the example, when the latch 12 is in the lock position, the latch face 12e and the engaging face 27c come into contact and are retained in a state where no gap exists between the latch face 12e and the engaging face 27c. Additionally, the latch face 12e and the engaging face 27c are flat faces, and the latch face 12e and the engaging face 27c come into surface contact. Accordingly, even when external force in the first pivoting direction R1 is applied to the cover 2, movement of the protruding portion 27a is reliably restricted by the latch 12. Accordingly, stability when the cover 2 is locked in the closed position is ensured.

Note that, when the cover 2 is caused to move from the closed position to the open position, as with Example 1, the leading end 18a is pressed against the latch 12 by pressing of the button 20, and the latch 12 is pressed downward in the −Z direction. As a result, the latch face 12e and the engaging face 27c are separated, the restriction on the protruding portion 27a by the latch 12 is released, and the cover 2 can be caused to move to the open position (refer to FIG. 7).

Additionally, in the reading apparatus 1A, as with Example 1, the latch 12 is positioned between the engaging portion 27 of the cover 2 being in the closed position and the pivoting shaft 9 of the cover 2, on the Y axis (refer to FIG. 4 to FIG. 7). That is, the latch 12 is disposed in an effective position relative to the second pivoting direction R2 of the cover 2. Thus, a closing operation of the cover 2 can be performed efficiently, and stability when the cover 2 is locked can also be enhanced.

According to the example, the following effects can be obtained.

The latch 12 moves in the −Y direction in the process of transitioning from the lock position to the lock release position. Owing to this movement of the latch 12, it becomes easy to readily lead the protruding portion 27a from the open position toward the closed position, and operability can be improved.

Further, in the process of transitioning from the lock release position to the lock position, the latch face 12e of the latch 12 moves from the −Y direction side to the +Y direction side, and the latch face 12e comes into contact with the engaging face 27c of the protruding portion 27a in the lock position. As a result, the protruding portion 27a is restricted by the latch 12. That is, even when external force in the first pivoting direction R1 is applied to the cover 2 in the lock position, the protruding portion 27a is restricted by the latch 12 from moving and thus, stability when the cover 2 is locked can be improved. In summary, both operability when the cover 2 transitions from the open position to the closed position and stability of the lock when the cover is set in the closed position can be achieved.

Additionally, in the case of the reading unit 8 of a contact image sensor type, when variation occurs in the distance to a medium to be read, accuracy of reading the medium tends to decrease. Causes of the occurrence of this variation in the distance between the reading unit 8 and the medium are conceivably backlash of the protruding portion 27a and the latch 12 in the closed position of the cover 2, disengagement of the lock of the cover 2 during reading, and the like. Nevertheless, in the example, the protruding portion 27a is restricted by the latch 12 in the lock position, and thus the cover 2 is stably retained in a locked state. Accordingly, reading accuracy of a medium by the reading unit 8 can be maintained.

Hereinafter, contents derived from the exemplary embodiments will be described.

A reading apparatus according to one embodiment includes a cover configured to pivot to an open position and a closed position, a lock mechanism of the cover configured to restrict the cover from pivoting in a first pivoting direction in a state where the cover is in the closed position, the first pivoting direction being the direction toward the open position, and a reading unit provided in the cover or in a position facing the cover in a state where the cover is in the closed position, and configured to read a medium in a state where the cover is in the closed position. The cover includes an engaging portion protruding in a second pivoting direction opposite to the first pivoting direction. The lock mechanism includes a latch configured to move, in an intersecting direction intersecting a pivoting shaft direction of the cover, to a lock position in which the latch is configured to engage with an engaging recessed portion of the engaging portion, and a lock release position in which the latch does not engage with the engaging recessed portion. The latch includes a latch face configured to, in a state where the cover is in the closed position, come into contact with an engaging face of the engaging recessed portion facing a leading side in the first pivoting direction, and, in association with the cover pivoting in the second pivoting direction, move in the intersecting direction and move to the leading side in the first pivoting direction.

In the above embodiment, the engaging portion protruding in the second pivoting direction toward the closed position is provided in the cover, and the latch configured to move in the intersecting direction intersecting the pivoting shaft direction of the cover and being engageable with the engaging recessed portion of the engaging portion is provided in the lock mechanism. Then, in locking of the cover 2, the latch moves in the intersecting direction and also moves to the leading side in the first pivoting direction toward the open position. That is, when the cover is locked, the latch not only moves in the intersecting direction being the locking direction, but also moves in the direction (first pivoting direction) opposite to the moving direction (second pivoting direction) of the cover. Thus, the cover can be locked without temporarily pressing the cover in the second pivoting direction beyond the formation position of the latch to lock the cover. Accordingly, even when a space inside the apparatus is narrow, the cover can be locked in a stable manner with favorable operability.

In the reading apparatus according to another embodiment, the engaging recessed portion is formed rearward, in the second pivoting direction, of a leading side end portion in the second pivoting direction of the engaging portion, and the latch is provided in a position between a pivoting shaft of the cover and the leading side end portion in a direction intersecting the pivoting shaft direction of the cover and the intersecting direction, in a state where the cover is in the closed position.

In the above embodiment, the latch is provided in such a position and thus, the cover can be locked effectively.

In the reading apparatus according to another embodiment, an inclined face configured to cause a force acting on the latch to escape toward the lock release position side is formed on a leading side in the second pivoting direction of the engaging portion, the force being caused by the engaging portion and the latch contacting when the cover pivots in the second pivoting direction from the open position.

In the above embodiment, the inclined face is formed on the leading side in the second pivoting direction of the engaging portion, and force in the second pivoting direction acting on the latch in association with the locking of the cover can be caused to escape toward the lock release position side. That is, when the cover is caused to move from a state where the cover is in the open position to the closed position, the inclined face is temporarily brought into contact with the latch to move the latch from the lock position to the lock release position, and in association with the cover moving to the closed position (in association with the engaging recessed portion arriving at the position of the latch), the latch is caused to move from the lock release position to the lock position, and the cover can be locked. Thus, the cover can be locked with favorable operability.

In the reading apparatus according to another embodiment, an inclined face configured to cause a force acting on the latch to escape toward the lock release position side is formed on a side facing the latch face of the latch, the force being caused by contact between the engaging portion and the latch when the cover pivots in the second pivoting direction from the open position.

In the above embodiment, the inclined face is formed on the side opposite to the latch face of the latch, and force in the second pivoting direction acting on the latch in association with the locking of the cover can be caused to escape toward the lock release position side. That is, when the cover is caused to move from a state where the cover is in the open position to the closed position, the inclined face is temporarily brought into contact with the engaging portion to move the latch from the lock position to the lock release position, and in association with the cover moving to the closed position (in association with the engaging recessed portion arriving at the position of the latch), the latch is caused to move from the lock release position to the lock position, and the cover can be locked. Thus, the cover 2 can be locked with favorable operability.

In the reading apparatus according to another embodiment, the reading unit is of a contact image sensor type.

A contact image sensor type reading unit has reading performance decreasing when the distance between the reading unit and a read original excessively increases. Thus, the contact image sensor type reading unit can be used in the reading apparatus of this exemplary embodiment enabling the cover to be stably locked, and capable of effectively suppressing an excessive increase in the distance between the reading unit and the medium and thus, a decrease in reading performance associated with the use of the contact image sensor type reading unit can be suppressed effectively.

In another embodiment, a reading apparatus includes a cover configured to pivot to an open position and a closed position, a lock mechanism configured to restrict the cover in the closed position from pivoting to the open position, and a reading unit provided in the cover or in a member facing the cover in the closed position, and configured to read a medium when the cover is in the closed position. The cover includes a protruding portion. The lock mechanism includes a latch configured to move to a lock position, in which the latch is configured to engage with the protruding portion, and to a lock release position, in which the latch does not engage with the protruding portion. The latch includes a latch face configured to come into contact with a face of the protruding portion, the face of the protruding portion facing toward one direction along a first axis when the cover is in a closed position, the first axis being orthogonal to a pivoting shaft of the cover. The latch face is configured to move in the other direction along the first axis when the latch moves from the lock release position to the lock position.

According to this configuration, the latch moves in the process of transitioning from the lock release position to the lock position. Owing to this movement of the latch, it becomes easy to readily lead the protruding portion from the lock release position toward the lock position, and operability can be improved.

Further, in the process of transitioning from the lock release position to the lock position, the latch face of the latch moves from one side of the first axis to the other side of the first axis, and the latch face comes into contact with a surface on the one side of the first axis of the protruding portion in the lock position. As a result, the movement of the protruding portion is restricted by the latch. That is, even when external force from the closed position to the open position is applied to the cover in the lock position, the protruding portion is restricted by the engagement with the latch, and stability when the cover is locked can be improved. In summary, both operability when the cover transitions from the open position to the closed position and stability of the lock when the cover is set in the closed position can be achieved.

In a reading apparatus according to another embodiment, the latch is positioned between the protruding portion of the cover being in the closed position and the pivoting shaft of the cover, on the first axis.

According to this configuration, the latch is disposed in an effective position relative to the pivoting direction of the cover. Thus, the closing operation of the cover can be performed efficiently, and stability when the cover is locked can also be enhanced.

In a reading apparatus according to another embodiment, the reading unit is of a contact image sensor type.

According to this configuration, the contact image sensor type reading unit, that is, the CIS type reading unit, can be miniaturized as compared to a Charge Coupled Device (CCD) type reading unit, for example. Thus, miniaturization of the reading apparatus can be achieved.

On the other hand, in the case of the contact image sensor type reading unit, when variation occurs in the distance to a medium to be read, accuracy of reading the medium tends to decrease. Causes of the occurrence of this variation in the distance between the reading unit and the medium are conceivably backlash of the protruding portion and the latch in the closed position of the cover, disengagement of the lock of the cover during reading, and the like. Nevertheless, according to the configuration described above, the protruding portion is restricted by the latch in the lock position, and thus the cover is stably retained in a locked state. Accordingly, miniaturization of the reading apparatus can be achieved, and reading accuracy of a medium by the reading unit can be maintained.

This application claims priority under 35 U.S.C. § 119 to Japanese Patent Application No. 2018-061412, filed Mar. 28, 2018 and No. 2018-220933, filed Nov. 27, 2018. The entire disclosure of Japanese Patent Application No. 2018-061412 and No. 2018-220933 are hereby incorporated herein by reference.

What is claimed is:

1. A reading apparatus comprising:
a cover configured to pivot to an open position and a closed position;
a lock mechanism of the cover configured to restrict the cover from pivoting in a first pivoting direction in a state where the cover is in the closed position, the first pivoting direction being the direction toward the open position; and
a reading unit configured to read a medium in a state where the cover is in the closed position, wherein
the cover includes an engaging portion protruding in a second pivoting direction opposite to the first pivoting direction,
the lock mechanism includes a latch configured to move, in an intersecting direction intersecting a pivoting shaft direction of the cover, to a lock position in which the latch is configured to engage with an engaging recessed portion of the engaging portion, and a lock release position in which the latch does not engage with the engaging recessed portion, and
the latch includes a latch face configured to,
in a state where the cover is in the closed position, come into contact with an engaging face of the engaging recessed portion facing a leading side in the first pivoting direction, and,
in association with the cover pivoting in the second pivoting direction, move in the intersecting direction and move to the leading side in the first pivoting direction.

2. The reading apparatus according to claim 1, wherein
the engaging recessed portion is formed rearward, in the second pivoting direction, of a leading side end portion in the second pivoting direction of the engaging portion, and
the latch is provided in a position between a pivoting shaft of the cover and the leading side end portion in a direction intersecting the pivoting shaft direction of the cover and the intersecting direction, in a state where the cover is in the closed position.

3. The reading apparatus according to claim 2, wherein
an inclined face configured to cause a force acting on the latch to escape toward the lock release position side is formed on a leading side in the second pivoting direction of the engaging portion, the force being caused by the engaging portion and the latch contacting when the cover pivots in the second pivoting direction from the open position.

4. The reading apparatus according to claim 2, wherein
an inclined face configured to cause a force acting on the latch to escape toward the lock release position side is formed on a side facing the latch face of the latch, the force being caused by the engaging portion and the latch contacting when the cover pivots in the second pivoting direction from the open position.

5. The reading apparatus according to claim 1, wherein
the reading unit is of a contact image sensor type.

6. A reading apparatus comprising:
a cover configured to pivot to an open position and a closed position;
a lock mechanism configured to restrict the cover in the closed position from pivoting to the open position; and
a reading unit configured to read a medium when the cover is in the closed position, wherein
the cover includes a protruding portion,
the lock mechanism includes a latch configured to move to a lock position, in which the latch is configured to engage with the protruding portion, and to a lock release position, in which the latch does not engage with the protruding portion,
the latch includes a latch face configured to come into contact with a face of the protruding portion, the face of the protruding portion facing toward a first direction along a first axis when the cover is in a closed position, the first axis being orthogonal to a pivoting shaft of the cover, and
the latch face is configured to move in a second direction along the first axis when the latch moves from the lock release position to the lock position.

7. The reading apparatus according to claim 6, wherein
the latch is positioned between the protruding portion of the cover being in the closed position and the pivoting shaft of the cover, on the first axis.

8. The reading apparatus according to claim 6, wherein
the reading unit is of a contact image sensor type.

* * * * *